Figure 1:
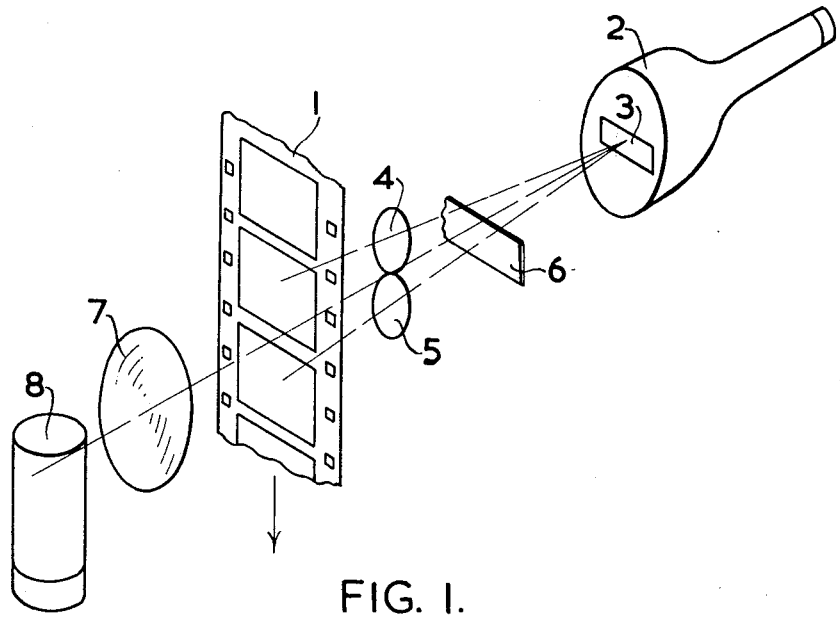

Aug. 14, 1962     T. C. NUTTALL     3,049,275
FILM TRANSPORT MECHANISM

Filed Feb. 25, 1960     5 Sheets-Sheet 1

INVENTOR
THOMAS CAYTON NUTTALL
BY Hanne and Nydick
ATTORNEYS

Aug. 14, 1962 T. C. NUTTALL 3,049,275
FILM TRANSPORT MECHANISM
Filed Feb. 25, 1960 5 Sheets-Sheet 3

INVENTOR
THOMAS CAYTON NUTTALL
BY Hane and Nydick
ATTORNEYS

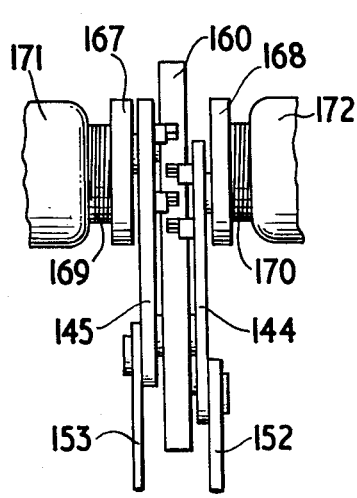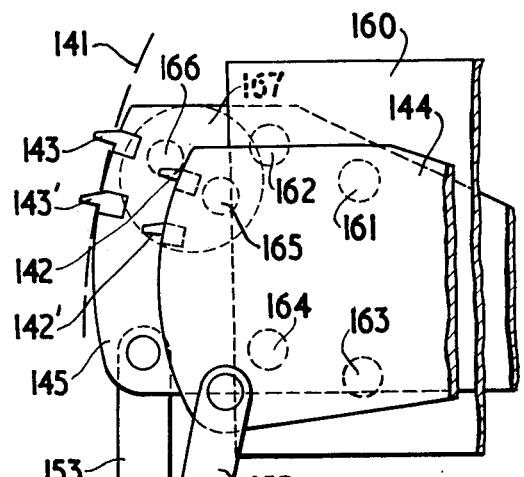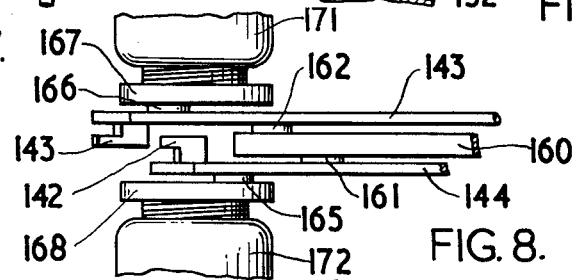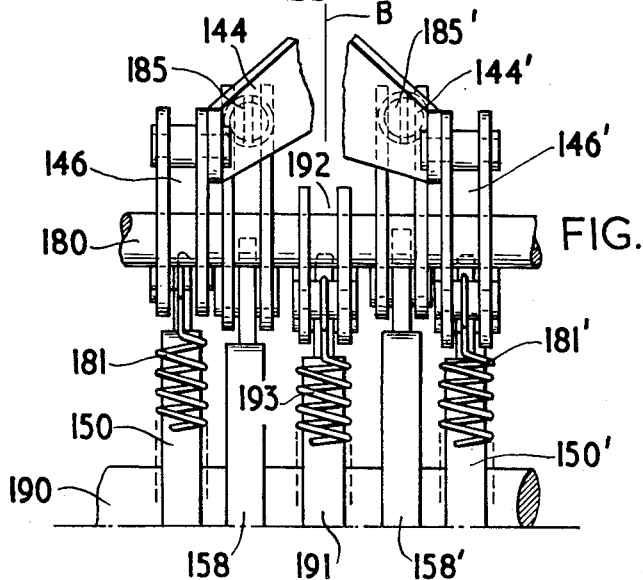

INVENTOR
THOMAS CAYTON NUTTALL
By Hanne and Nydich
ATTORNEYS

3,049,275
FILM TRANSPORT MECHANISM
Thomas Cayton Nuttall, Croydon, England, assignor to Bush and Rank Cintel Limited
Filed Feb. 25, 1960, Ser. No. 10,945
Claims priority, application Great Britain Mar. 10, 1959
9 Claims. (Cl. 226—63)

This invention relates to improvements in mechanism for effecting the transport of kinematographic film which enables improved registration to be obtained when stretched or shrunk film is being transported. The invention has particular application to apparatus in which each film frame in turn is required to be transported in an exactly repetitive velocity cycle from a first position to a second displaced from the first by a predetermined distance. This requirement exists, for example, in some kinds of television apparatus for scanning film to derive or to record television signals. In such apparatus it is usual for the film to be transported with uniform velocity while being scanned and for the frame scanning process itself to be substantially linear with respect to time. This is not an essential condition for the advantages of the invention to be obtained, however, and it may equally well be applied in apparatus producing a non-uniform film velocity.

Many film transport arrangements have been described which can perform the required operation without difficulty upon film of constant dimensions. However, in practice, the dimensions of commercial film stock vary appreciably with time and with climatic conditions and a grave problem is presented to the designer of transport mechanism, which must produce the same uniform movement of the film frame whatever its dimensions within a range which is large compared with the accuracy of movement which is required.

It has therefore been usual in film transport mechanisms to provide elements which sense any variation in the film dimensions and correspondingly vary the operation of the transport mechanism to produce a constant rate of transport. Thus a number of mechanisms have been described in which the effective diametral pitch of a film transport sprocket may be varied to suit differently shrunk lengths of film. The construction of such devices is complex and their connection with means for sensing the changed dimensions of the film requires complex mechanism.

It is an object of the invention to provide a film transport mechanism which inherently accepts film of varying linear dimensions without disturbance of its operation.

It is likewise an object of the invention to provide a film transport mechanism in which manual or automatic adjustment of the operation to suit differently shrunk films is unnecessary.

It is a further object of the invention to provide a film transport mechanism in which the film is transported through a gate with great uniformity of velocity.

It is another object of the invention to provide a film transport mechanism such that whatever the state of film shrinkage each successive picture frame is transported through a uniform distance at a constant velocity by transport members performing a dimensionally and temporally unchanging cycle of operations.

Film transport mechanism according to the invention may comprise in combination means for guiding a film along a predetermined path, at least first and second transport members each having a driving surface, means for causing each in turn of said members to enter a perforation in said film with said driving surface initially rearwardly displaced from an edge thereof and to advance in the direction of film movement in a predetermined velocity cycle, such that after another transport member has entered a subsequent perforation of said film the distance between said driving surfaces is reduced, whereby the driving surface of said other transport member engages an edge of its perforation and the driving surface of first said transport member disengages from the edge of its perforation, and means for withdrawing each disengaged driving member from the film and for returning it to recommence the recited cycle of operation.

In one embodiment of the invention the two transport members are claws arranged to engage the film alternately. In order to ensure continuity of operation during the changeover from one claw to the other, the second claw must engage a second perforation before the first claw can be disengaged from the first perforation. There is therefore a brief interval of overlap in which both claws are engaged in their respective perforations. During this interval the choice as to which claw is driving the film is determined by the relation of longitudinal spacing between the two claws to the perforation pitch of the film. When the second claw is entering the second perforation it is arranged that the distance between the claws is greater than the perforation pitch, so the claw enters without touching the edge of the perforation. The distance between the claws is then reduced to less than the perforation pitch, which causes the driving function to be transferred from the first claw to the second claw. The first claw can then be withdrawn without touching the edge of the perforation.

The changeover in the drive takes place when the reducing distance between the claws passes through the value corresponding to the perforation pitch. The actual instant of changeover is therefore slightly variable according to the state of shrinkage of the film, but it can be arranged that the changeover always occurs within the limits of the available time interval between the completion of the second scanning of the first frame and the start of the first scanning of the second frame.

The required reduction in the distance between the claws may be brought about by a deceleration of the first claw, an acceleration of the second claw, or a combination of these means, but the mechanical difficulties are minimised by utilizing only a deceleration of the first claw.

During the complete scanning of any one picture the longitudinal location of the film is, in apparatus according to the invention, determined from one particular perforation. When reversal film is to be used, it is advantageous so to arrange apparatus according to the invention that the perforations used to transport the film are those used to locate the film in the camera used to take the picture since the system will then be immune to the effects of any irregularity in the perforation of the film. But even where this particular advantage is not present apparatus according to the invention still offers great advantages when handling shrunk film.

Figure 2:
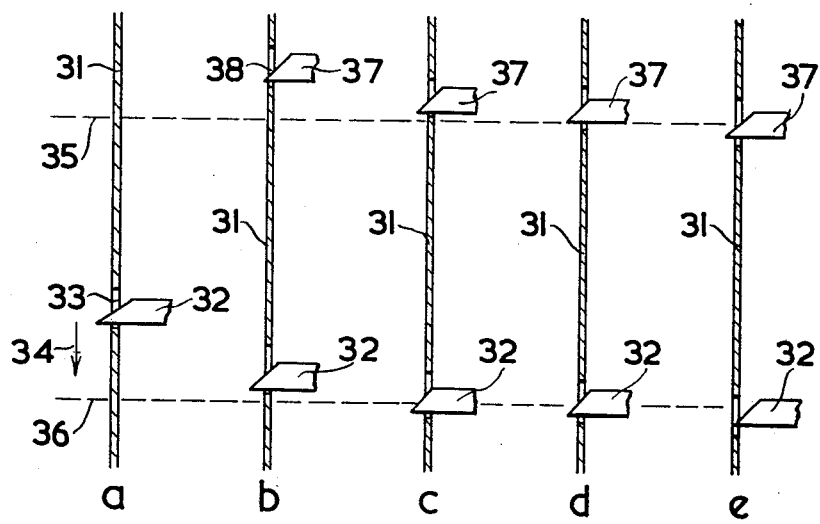
Figure 3:
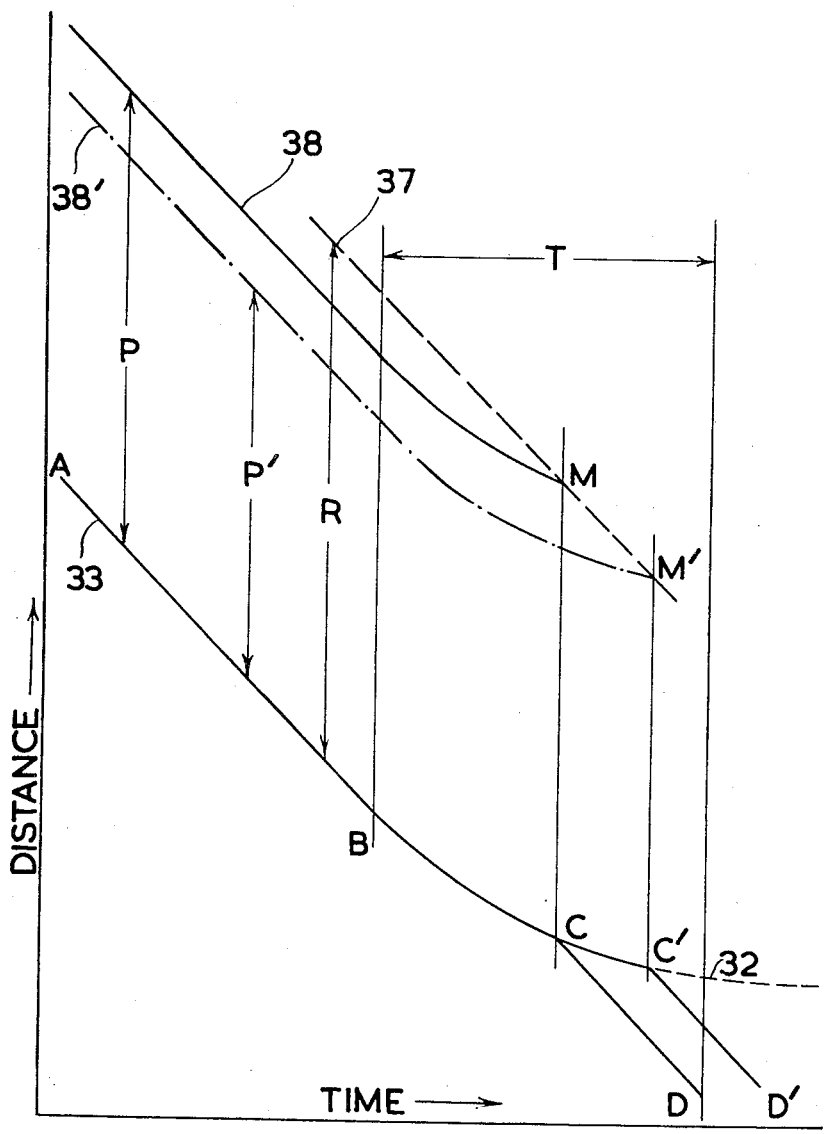
Figure 4:
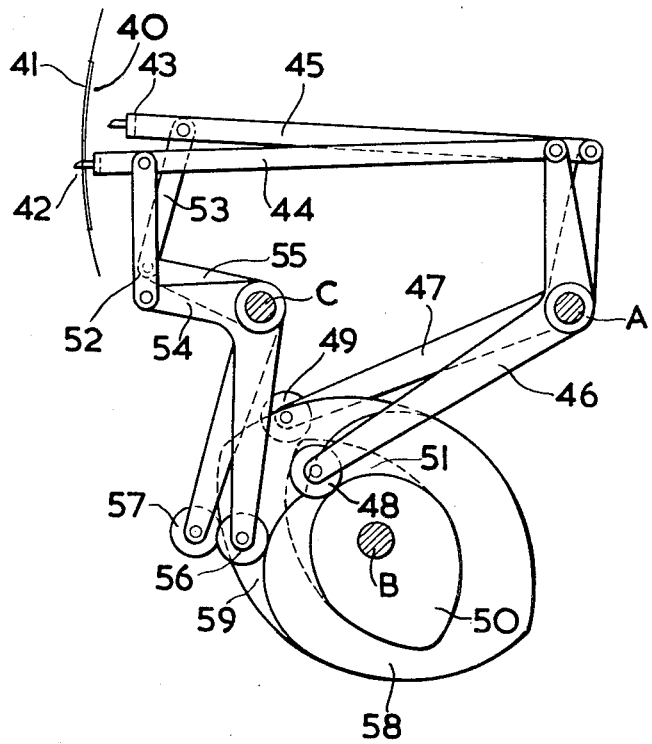
Figure 5:
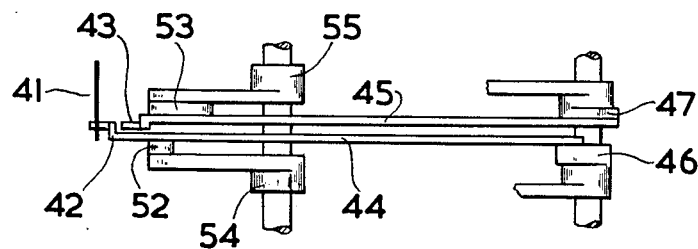
Figure 9:
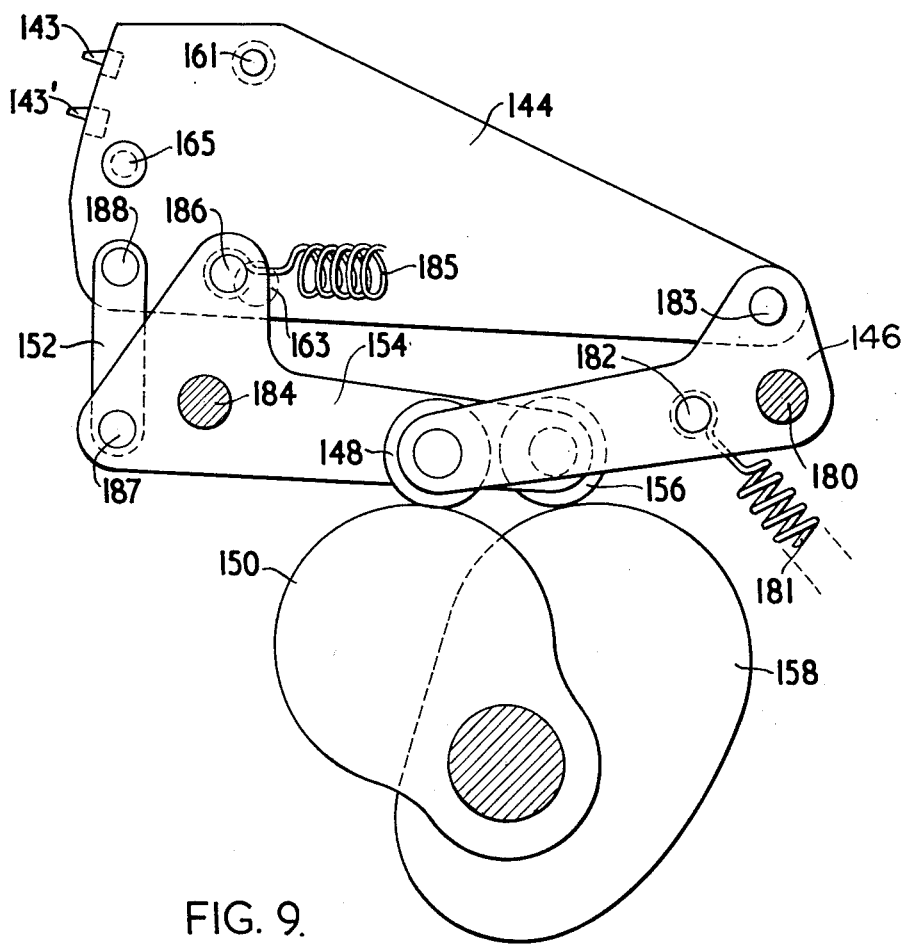
Figure 10:
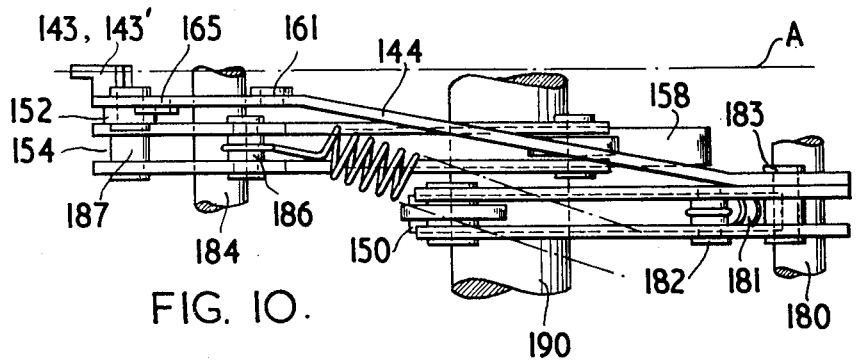

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIGURE 1 is a diagram illustrating the principles of known television apparatus of the type to which the present invention applies, FIGURE 2 is a series of diagrams illustrating the engagement of transport members with a film in apparatus according to the invention, FIGURE 3 is a graphical diagram illustrating the operation of apparatus according to the invention, FIGURE 4 is a side elevation of part of a claw mechanism for film transport in accordance with the invention, FIGURE 5 is a partial plan view of the mechanism shown in FIGURE 4, FIGURES 6, 7 and 8 show three views of a detail of a practical embodiment of apparatus according to another embodiment of the invention, FIGURES 9 and 10 show respectively an elevation and a plan view of one set of linkage forming part of the embodiment of which a detail is shown in FIGURES 6–8, and FIGURE 11 shows an optical detail of apparatus as described with reference to FIGURES 6–10.

In the known television apparatus shown in FIGURE 1 a vertically arranged film, of which a fraction only is shown at 1 is drawn downwards at a uniform speed such that one picture frame and frame bar pass any point in $\frac{1}{25}$ second past a position at which it is scanned to develop television signals. The scanning arrangement is a cathode ray tube 2, on the screen of which a television scanning pattern or raster of two interlaced fields 3 is traced by the electron beam under the control of conventional deflection means (not shown). The aspect ratio of this raster is 8:3 instead of the normal 4:3 ratio, so that the raster is half the usual height.

Two lenses 4 and 5 are so placed as to project on film 1 images of raster 3 which are displaced in the direction of film travel by one-half the height of a frame, so that they are contiguous. As the film moves downward it is thus scanned in two interlaced fields, for the film movement provides the missing fraction of the raster height. A shutter, of which one blade 6 only is shown, is arranged to prevent both images being present simultaneously on the film.

Light passing through the film is collected by a lens 7 and cast upon the cathode of a photomultiplier 8, the output of which thus provides the desired television signals.

The operation of television apparatus of this type is critically dependent upon the film being moved with absolutely uniform velocity through the scanning position, for if the speed changes the scanning lines will not fall correctly on the film and a loss of definition will result. As has already been explained, conventional means for producing the necessary film travel have required the provision of elaborate means for adjusting the mechanism to differently shrunk film.

The present invention overcomes this disadvantage of prior apparatus by means now to be described in relation to FIGURES 2 and 3.

In diagram *a* of FIGURE 2 a fragment of the film being transported is shown at 31. A claw 32, of which part only is shown, engages a sprocket-hole 33 in the film and is moved downwards at a uniform speed, carrying the film with it in the direction shown by the arrow 34. This uniform motion is arranged to persist for the time necessary for television apparatus (not shown) to scan completely one frame of the film and during this time the film is moved through a predetermined distance, that is over the distance between broken lines 35 and 36.

It may be seen from diagrams 2*b*—2*e* that as claw 32 nears the bottom of its stroke a second claw 37 which is then travelling in the same direction and at the same speed as the film, is engaged in a subsequent sprocket hole 38, at first in such a position as not to exert any force on the film. Immediately claw 32 has transported film 31 through the required distance it decelerates so that as claw 37 maintains its constant speed the latter takes over from the former the function of transporting film 31. During this takeover process the film speed will vary in a manner dependent upon what dimensional inaccuracy may be present in the film, but uniform transport at the desired speed will in any case be reestablished before the scanning of the next picture frame is begun.

The operation of the apparatus illustrated by FIGURE 2 is further explained by the diagram of FIGURE 3, which contains graphs, plotted to a common time scale, of the movements of claws 32 and 37, and of the film velocity. In FIGURE 3, solid line 33 from A—B represents the uniform downward movement of the driven edge of perforation 33 and of the driving edge of claw 32 while the latter moves downward at constant velocity; while from B—C line 33 represents the deceleration of the sprocket hole as claw 32 is decelerated.

Line 38 represents the movement of the driven edge of perforation 38. Its movement is of course identical with that of perforation 33 but is displaced from it by a distance P equal to the perforation pitch of the film.

Behind claw 32 at a distance R, which is slightly more than the perforation pitch of unshrunk film, follows claw 37, the movement of which is illustrated by broken line 37. As the film decelerates the driving edge of claw 37 will first approach and then encounter the driven edge of perforation 38. When this occurs, the movement of the film is no longer governed by claw 32, but is instead controlled by claw 37, which at this time is moving at the required constant velocity. From point C, therefore, the film will adopt the velocity of claw 37 and line 33 thus leaves the broken line 32 representing the continued deceleration of claw 32 and instead runs to D parallel to line 37.

Similarly, the line 38 representing the second perforation runs equidistantly from that representing the movement of claw 32 until it meets line 37 at the point of contact of claw 37 with the edge of perforation 38, indicated by M.

The operation of the apparatus in the case of a film shrunk considerably more and having therefore a reduced perforation pitch P', is illustrated by chain line 38' which will be seen to meet line 37 at M', signifying that the driving edge of claw 37 meets the driven edge of perforation 38'. Later in the transition period T than in the case of less-shrunk film.

When a film which has suffered considerable shrinkage is being scanned, the change in film velocity will be very much larger, since the distance (R—P') the film must "drop back" before its sprocket hole engages the second claw will be very much more.

Exactly the same sequence of operations occurs when claw 37 gives place to claw 32 during the next transition period, after which the cycle is again repeated.

Considerable advantage is thus gained that there is no necessity to make any adjustment to the mechanism when differently-shrunk films are passed through it, since the necessary compensation is automatically produced by the transport mechanism.

The mechanism illustrated in FIGURES 4 and 5 shows the essential features of a claw film transport mechanism for carrying out the invention. A practical embodiment would differ from that illustrated in ways well understood by those skilled in the art and as hereinafter described.

In this mechanism a guide 40 causes the film 41 to be transported to be led in a circularly curved path which is coaxial with the locus of whichever claw is at any time operative to drive the film. There are two claws, 42, 43 which operate successively in the same single line of perforations in the film, and the working tips of these claws should be as nearly as practicable identical in profile to ensure the same behaviour of the film whichever claw is operative. Each claw in turn performs a working stroke downwards which is followed by a return stroke during the period in which the other claw drives the film. During its return stroke each claw must be not merely disengaged from the film but withdrawn sufficiently far to ensure that on its way up it will pass clear of the other claw coming down. Thus in a vertical plane through their centre lines the two claws rotate about each other. The effective size of the claws perpendicular to the film is reduced to a reasonable value by cranking them in opposite directions a short distance behind the working tips, as shown in FIGURE 5.

As illustrated, each claw may be formed as the end of one of claw levers 44, 45 each of which is pivoted at its other end to an arm of one of bell-crank engagement levers 46, 47, pivoted upon a shaft A, the other arms of which carry roller followers 48, 49 which run respectively on edge engagement cams 50, 51 secured to a shaft B. Near the claws, claw levers 44, 45 are connected by transport links 52, 53 to the arms of further bell crank transport levers 54, 55 which are pivoted upon a shaft C and of which the other arms carry roller-followers 56, 57 running upon transport edge cams 58, 59 which also are fast upon shaft B, which is arranged to be rotated anticlockwise at an appropriate speed.

The forms and phasings of the cams carried by shaft B are illustrated only approximately, the exact requirements differ with the precise geometry adopted for the linkages and can be appropriately designed to suit an individual case. Although these cams are illustrated as being edge cams this is in no way essential to the operation of the mechanism. It is assumed that suitable springs (not shown) are provided to ensure that the followers do in fact remain at all times in contact with their respective cams.

Before each claw comes into contact with the edge of a perforation in the film its center becomes fixed, since the follower 48 or 49 of that engagement lever 46 or 47 to which it is pivoted will then rest upon a dwell in engagement cam 50 or 51. It is arranged that the pivot of claw lever 44 or 45 is then coaxial with the film path in the gate so that the operative claw engages the film always at the same part.

The downward movement of the claw is controlled by transport link 52 or 53, transport lever 54 or 55 and cam 58 or 59. The working stroke is terminated by a change in cam profile which produces a deceleration of the claw after which cam 50 or 51 causes the claw to start its disengagement from the film. During its upward movement each claw lever is withdrawn sufficiently for the claw which it carries to pass behind the other claw as it descends.

It is sometimes found that the pictures on the film are not placed in the specified position relative to the perforations. To assist in correcting for such a condition, and adjusting the framing of the picture, the entire mechanism may be mounted so that it may be rocked in a small arc centered approximately at the position of the temporarily fixed end of the operative claw lever.

The drawing shows the minimum required for purposes of explanation. It will be obvious that considerable modifications might be effected in a practical design. The bell cranks might possibly be constructed as strutted triangular frameworks to achieve a suitable ratio of stiffness to mass so that resonant frequencies could be raised above the spectrum of frequencies to be transmitted from the cams to the claw. Pin joints may be replaced by joints giving a minimum of compliance, again with the object of raising objectionable resonant frequencies. Members such as the claw levers would require additional constraints (in this case, preferably sliding constraints) to restrict the number of degrees of freedom (in this case to two degrees of freedom). Various springs would be required and any resonances falling within the working frequency range would require suitable damping means.

Although the cams must obviously be manufactured with considerable accuracy, a useful relaxation of tolerance on absolute dimensions might be obtained by providing a small range of adjustment on the lever ratios.

FIGURES 6–8 show the ends of claw levers 144, 145 each of which carries two claws 142, 142'; 143, 143', respectively.

In normal operation only the upper one 142, 143 of each pair of claws actively engages the film. The lower claw 142', 143' is disposed so as to enter a perforation in advance of that engaged by the corresponding active claw 142, 143, but not to come into operative engagement with the edge of the perforation. If, however, either active claw encounters a perforation which is damaged to an extent such that proper movement of the film cannot be produced, then the corresponding normally inactive claw 142', 143' will come into engagement with the edge of the perforation in which it is entered and will produce at least a close approximation to the desired film movement. Claw levers 144, 145 are reciprocated in planes perpendicular to the film path indicated by broken line 141 by one pair of elements of the cam mechanism to be described in detail with respect to FIGURES 9–11 and are caused cyclically to move along the film path and return to their starting points by another pair of elements of the cam mechanism operating through the intermediary of links 152, 153.

To ensure that claws 142, 142', 143, 143' carried on claw levers 144, 145 move in the required paths, the claw levers are each provided with three guide shoes 161, 163, 165 and 162, 164, 166 respectively. Two of the guide shoes, 161, 163 and 162, 164, are placed on the inner faces of each of the claw levers and slide upon a central guide plate 160 while the third guide shoe 165, 166 of each set is placed on the other face of the claw lever and slides upon one of two laterally adjustable outer guide plates 167, 168. These outer guide plates may be carried on screwed stems 169, 170 engaging in support members 171, 172 carried from the main framework (not shown) of the mechanism or other means of adjusting their distance from guide-plate 160 may be used. It is essential that during adjustment the guiding surface of the outer guide plate remains parallel with the opposing face of guide-plate 160. Guide plates 167, 168 are adjusted until the claws move in the same desired plane and the adjustments are then locked by any suitable conventional means (not shown).

FIGURES 9 and 10 illustrate the cam mechanism which produces the movement of claw lever 144. The mechanism associated with claw lever 145 is a mirror image of that shown about line A in FIGURE 10 which passes through the center of the claws 143, 143'.

The advancement of the claws into engagement with the film and their withdrawal is controlled by a bell-crank engagement lever 146 which is carried upon a shaft 180 suitably mounted to the frame (not shown) of the mechanism. Lever 146 is formed of spaced identical members carrying between them a roller follower 148 which runs on an engagement cam 150 and is maintained in contact with it by a spring 181 stretched between an anchor pin 182 forming part of crank lever 148 and a fixed anchorage (not shown) formed on the frame. Claw lever 144 is hinged to engagement lever 146 by a pin 183 and is offset along its length to permit the claws to move in the same space as those of the other half of the mechanism.

The travel of claw lever 144 in the direction of film movement is obtained by a cranked transport lever 154 pivoted on a stationary shaft 184 suitably mounted in the frame (not shown) of the mechanism. Transport lever 154 is also of double construction and carries a roller follower 156 engaging a transport cam 158 under the influence of a spring 185 strained between an anchor pin 186 forming part of lever 154 and a suitable fixed anchorage (not shown). Transport lever 154 is connected to claw lever 144 by a transport link 152 which is hinged to lever 154 by a pin 187 and to lever 154 by a pin 188.

Cams 150, 158 are secured to or may be integral with a camshaft 190 which is carried in suitable bearings in the mechanism framework (not shown) and is arranged for rotation by suitable conventional means, preferably by an electric motor having its rotor mounted directly to the camshaft.

FIGURE 11 is a partial end view of the apparatus illustrated in FIGURES 6–10 and showing also the mechanism for operating the other set of claws. The elements of this additional mechanism are the mirror image of those for the first about the central plane indicated by line B and are designated by like reference numerals distinguished by the prime (').

This figure shows how in accordance with an addition to the invention a fifth, compensating cam 191 may be placed on the camshaft 190. Compensating cam 191 drives a follower arm 192 loaded by a spring 193 but not connected to any other part of the mechanism. This additional cam and follower serve to ensure that the moving masses of the system are in at least approximate static balance in all positions of the camshaft. To this end it may be found desirable to augment the mass of the follower arm 193 by the addition of a metal block between its sides. It may in addition be advantageous to provide the arm with a crank extension loaded by or itself constituting a suitable mass. The tension of the spring 193 and its rate may be adjusted to ensure that so far as is possible there is no tendency for the camshaft to come to rest in any disadvantageous position under the influence of the springs acting on the cam follower levers.

Details of the means whereby the cam-follower arms are located upon their pivot shafts and the various shafts retained in parallel alignment are not disclosed as these are matters of common engineering practice and convenience and will be obvious to those skilled in the art.

It may be remarked that shafts 180, 184 upon which the cam-follower levers are mounted will not be formed as continuous, stationary shafts but will in practice constitute pivot pins each secured in its own follower arm and carried in appropriate individual bearings formed in or carried upon the supporting framework.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A film transport apparatus comprising in combination: means for guiding a film along a predetermined path, first and second claw levers bearing respectively first and second claws for engaging perforations in said film, a camshaft, first and second engagement cams mounted for rotation with said camshaft, first and second engagement levers, first and second engagement follower members carried on said respective engagement levers, and each cooperating with a respective engagement cam, pivot means connecting said first and second claw levers to said first and second engagement levers respectively so that rotation of said camshaft causes said claws to enter and withdraw from perforations in said film, first and second transport cams mounted for rotation with said camshaft, first and second transport levers, first and second transport follower members carried on respective transport levers, and each cooperating with a respective transport cam, first and second transport links pivotally connecting said first and second claw levers to respective first and second transport levers so that rotation of said transport cams produces movement of said claws in the direction of said film path, so that by the combination of said movements each of said claws is caused in turn to enter first said perforation with its driving surface initially rearwardly displaced from an edge thereof, to move so as to lessen the distance of its driving edge from that of said precedingly operative transport member, so that the driving edge of first said transport member engages said edge of first said perforation and until the driving edge of said precedingly operative driving member is disengaged from the edge of said preceding perforation, and to cause said precedingly operative driving member thereafter to be withdrawn from engagement in said preceding perforation and to return to engage a succeeding perforation in said row.

2. A film transport mechanism comprising in combination: means for guiding a film along a predetermined path, first and second claw levers bearing respectively first and second claws for engaging perforations in said film, a camshaft, first and second engagement cams mounted for rotation with said camshaft, first and second engagement levers, first and second engagement follower members carried on said respective engagement levers, spring means urging each engagement follower member against a respective engagement cam, pivot means connecting said first and second claw levers to said first and second engagement levers respectively so that rotation of said camshaft causes said claws to enter and withdraw from perforations in said film, first and second transport cams mounted for rotation with said camshaft, first and second transport levers, first and second transport follower members carried on respective transport levers, spring means urging each transport follower member against a respective transport cam, first and second transport links pivotally connecting said first and second claw levers to respective first and second transport levers so that rotation of said transport cams produces movement of said claws in the direction of said film path, so that by the combination of said movements each of said claws is caused in turn to enter first said perforation with its driving surface initially rearwardly displaced from an edge thereof, to move so as to lessen the distance of its driving edge from that of said precedingly operative transport member, so that the driving edge of first said transport member engages said edge of first said perforation and until the driving edge of said precedingly operative driving member is disengaged from the edge of said preceding perforation, and to cause said precedingly operative driving member thereafter to be withdrawn from engagement in said preceding perforation and to return to engage a succeeding perforation in said row.

3. A film transport mechanism according to claim 2 the form of said transport cams being such that during at least those periods in which one only of said claws engages said film that claw is advanced with uniform velocity along said film path.

4. A film transport mechanism according to claim 2 and comprising also in combination a compensating cam mounted for rotation with said camshaft, a compensating lever, a compensating follower mounted on said compensating lever and spring means urging said compensating follower into engagement with said compensating cam, said compensating lever being of such form and mass and said compensating cam being of such form that the centre of mass of said mechanism remains substantially stationary as said camshaft rotates.

5. A film transport mechanism according to claim 2 and comprising also in combination an inner guide plate disposed between said first and second claw levers and having planar guiding surfaces parallel to the plane of movement of the claws, outer guide plates disposed without said claw levers and having planar guiding surfaces parallel to those of said inner guide plate, a pair of guide shoes mounted upon the inner side of each claw lever and sliding upon said inner guide plate and single guide shoes mounted upon the outer side of each claw lever and sliding upon said outer guide plate, and means for flexing said claw levers to cause said shoes to be urged against said guide plates.

6. A film transport mechanism according to claim 2 and comprising also first and second auxiliary claws having driving surfaces and being carried respectively upon said first and second claw levers and so positioned as normally to enter perforations in said film without said driving surface contacting edges of said perforations, but to encounter an edge of such perforation in the event of a main claw encountering a damaged perforation.

7. A film transport apparatus according to claim 2 in which said claws are offset from said claw levers and said claw levers move under the action of said cams to cause each claw to follow a closed path around the other.

8. A film transport apparatus according to claim 2 said mechanism being symmetrical about a plane containing the paths of said claws.

9. In a film transport mechanism for producing continuous movement of a film provided with at least one longitudinally extending row of perforations spaced at a nominal predetermined pitch, the combination of: several transport members each having a driving surface, a transport linkage producing movement of said transport members in identical but differently timed velocity cycles in the direction of movement of said film, and an engagement linkage producing movement of said members in identical but differently timed velocity cycles in the direction perpendicular to that of film movement such that said transport members follow the same path in space, said transport and engagement linkages cooperating to cause each said transport member in turn to engage a perforation in one row in said film, which is moving under the control of a precedingly operative transport member engaged in a preceding perforation in said row, with its driving surface initially rearwardly displaced from an edge thereof, to move so as to lessen the distance of its driving edge from that of said precedingly operative transport member, so that the driving edge of first said transport member engages said edge of first said perforation and until the driving edge of said precedingly operative driving member is disengaged from the edge of said preceding perforation, and to cause said precedingly operative driving member thereafter to be withdrawn from engagement in said preceding perforation and to return to engage a succeeding perforation in said row.

References Cited in the file of this patent

UNITED STATES PATENTS

| 1,372,733 | Workman et al. | Mar. 29, 1921 |
| 2,032,422 | Larson | Mar. 3, 1936 |
| 2,136,930 | Albrecht et al. | Nov. 15, 1938 |
| 2,382,772 | Canady | Aug. 14, 1945 |
| 2,719,455 | Mitchell | Oct. 4, 1955 |

FOREIGN PATENTS

| 870,945 | Germany | May 11, 1953 |